United States Patent [19]

Hofmann

[11] Patent Number: 5,386,888
[45] Date of Patent: Feb. 7, 1995

[54] ANTI-SKID DEVICE FOR MOTOR VEHICLES

[75] Inventor: Peter W. Hofmann, Aalen-Unterkochen, Germany

[73] Assignee: Rud-Kettenfabrik Rieger & Dietz GmbH.u.Co., Aalen, Germany

[21] Appl. No.: 58,526

[22] Filed: May 6, 1993

[30] Foreign Application Priority Data

May 8, 1992 [DE] Germany ............... 4215371

[51] Int. Cl.$^6$ .......................................... B60T 1/00
[52] U.S. Cl. ..................................................... 188/4 B
[58] Field of Search ............... 188/4 B; 152/214, 216, 152/221, 222; 280/757

[56] References Cited

U.S. PATENT DOCUMENTS

| 2,264,466 | 12/1941 | Weisel | 188/4 B |
| 4,800,992 | 1/1989 | Andersson et al. | 188/4 B |
| 5,076,379 | 12/1991 | Bahr et al. | 188/4 B |

FOREIGN PATENT DOCUMENTS

| 162823 | 8/1988 | European Pat. Off. |
| 197902 | 10/1990 | European Pat. Off. |
| 3645126 | 3/1988 | Germany |

Primary Examiner—Robert J. Oberleitner
Assistant Examiner—Chris Schwartz
Attorney, Agent, or Firm—Mark P. Stone

[57] ABSTRACT

An anti-skid device for motor vehicles has chain lines (15) which are propelled into the region of the ground contact surface of a vehicle tire by centrifugal forces resulting from rotation of a holder (14) carrying the chain lines when the holder engages the flank of a vehicle tire by a pivoting unit (11). The pivoting unit is actuated by first and second pull lines (9, 17), the first pull line being fastened to a driving aggregate (5) and the second pull line being fastened to a return spring (18) which is arranged in a cavity (20) of a carrying part (21) for the pivoting unit.

12 Claims, 3 Drawing Sheets

5,386,888

ANTI-SKID DEVICE FOR MOTOR VEHICLES

BACKGROUND OF THE INVENTION

The invention relates to an anti-skid device for motor vehicles, with a plurality of chain lines which are fastened to a holder capable of being set in rotational movement by the vehicle tire and of which the ends facing away from the holder, with the holder rotating in the operating position, are thrown away from the holder under the effect of centrifugal force into the region of the ground contact surface of the rotating vehicle tire, with a pivoting unit which is arranged on a carrying part fastened to the vehicle and having a cavity and which is intended for a jib arm carrying the holder, and with means for introducing oppositely directed pivoting movements into the pivoting unit, by which means the jib arm can be moved out of its position of rest into its operating position and back.

An anti-skid device of the foregoing type is known from DE,3645,126 C2. In the known device, the carrying part is formed by a carrier tube which, for positioning purposes, is displaceable to and fro and is pivotable about its longitudinal axis. On one end of the carrying part, the latter carries a pivoting unit, driveable by a flexible shaft and designed as a worm gear, for the jib arm carrying the holder. Although the worm gear allows a highly accurate positioning of the anti-skid device, its outlay in terms of production is nevertheless comparatively high. Particularly on vehicles with compressed-air braking systems, therefore, simpler pivoting units actuable by compressed air, such as are known, for example, from EP 0,162,823 B1, are used for preference. In the anti-skid device disclosed in the publication mentioned last, the pivoting unit consists essentially of two disks which are arranged eccentrically on the pivot axle of the jib arm and into which oppositely directed movements can be introduced by two pull cords of Bowden pulls, a compressed-air unit serving for actuating the pull cord transferring the holder out of its position of rest into its operating position, and a compressed-air spring serving for returning the holder from its operating position into the position of rest, the said compressed-air spring being arranged, together with the compressed-air unit, at a point on the vehicle relatively far removed from the pivoting unit and consequently necessitating the use of long Bowden pulls both for connecting the compressed-air unit and for connecting the compressed-air spring to the pivoting unit.

SUMMARY OF THE INVENTION

The object on which the invention is based is to simplify an anti-skid device of the relevant generic type and to make it as compact as possible. This object is achieved, according to the invention, in that there serves for introducing the pivoting movement, transferring the jib arm out of the position of rest into the operating position, into the pivoting unit a first pull line which can be actuated indirectly or directly by the vehicle driver and one end of which is fastened to a first driving pulley connected to the pivot axle of the pivoting unit and surrounds the said first driving pulley over at least part of its circumference, in that there serves for introducing the pivoting movement, transferring the jib arm out of the operating position into the position of rest, into the pivoting unit a second pull line which is under the effect of a return spring and one end of which is fastened to a second driving pulley connected to the pivot axle of the pivoting unit and surrounds the said second driving pulley over at least part of its circumference, and in that the return spring is arranged in the cavity of the carrying part for the pivoting unit.

The anti-skid device according to the invention on the one hand affords the same advantageous possibility of positioning the holder as the anti-skid device of the same generic type and on the other hand is characterized by an even simpler and more compact construction than the second known anti-skid device described, in that the carrying part is used as a housing for the protected accommodation of the return spring. In addition, one of the pull lines required can be extremely short as a result of the arrangement of the return spring in the immediate vicinity of the pivoting unit.

BRIEF DESCRIPTION OF THE DRAWINGS

Further details and features of the invention emerge from the subclaims and from the following description of an especially advantageous embodiment illustrated in the accompanying drawing. In this:

DESCRIPTION OF THE BEST MODES FOR CARRYING OUT THE INVENTION

Figure 1:
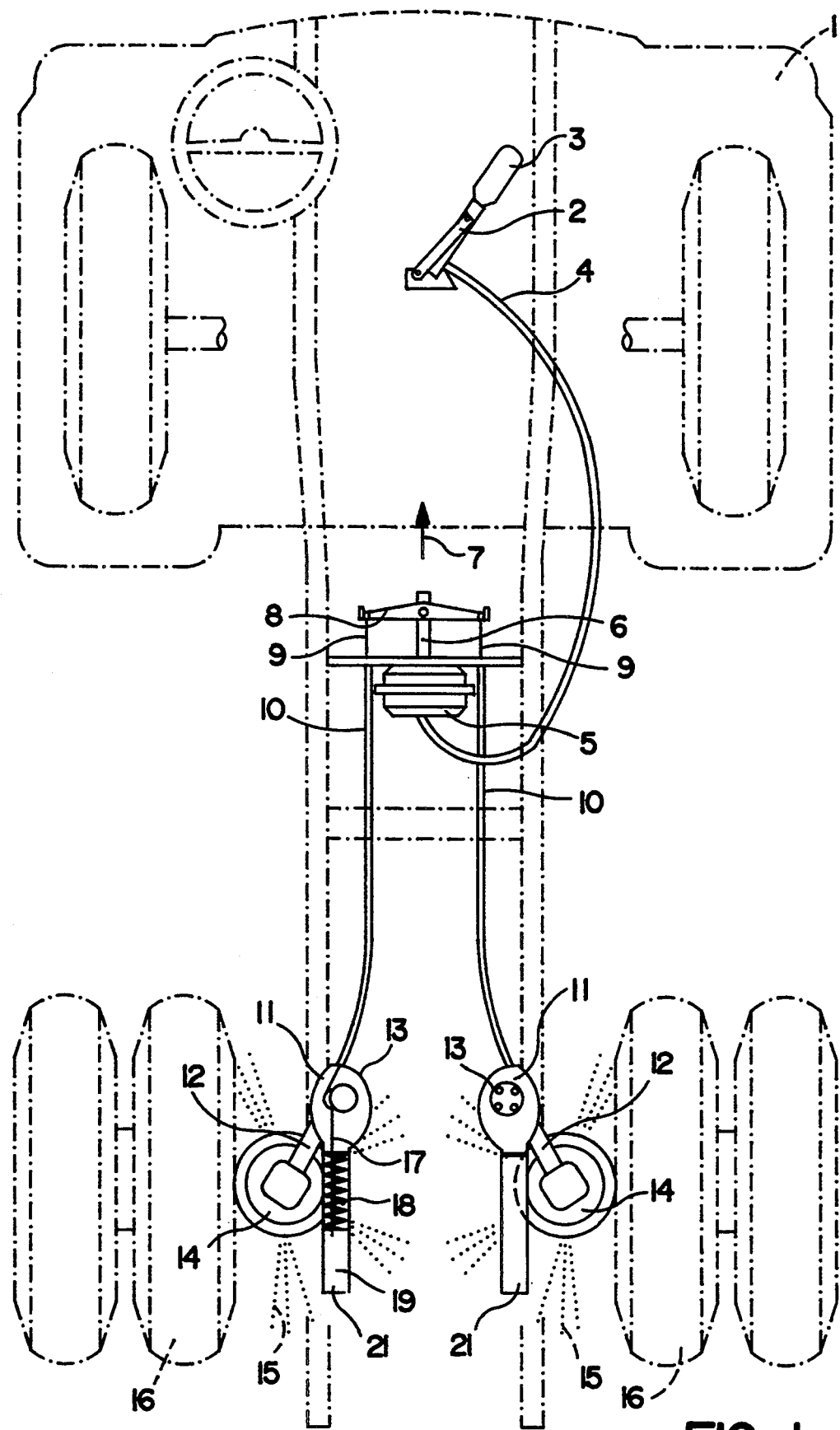
FIG. 1 shows a top view of two anti-skid devices, of which the holders designed as friction wheels and intended for chain lines are in the operating position.

Located in the driver's cab 1 of a motor vehicle is a lever 2 of a compressed-gas source which can be equipped with compressed-gas cartridges 3 of a commercially available type. When the lever 2 is actuated, the compressed-gas cartridge 3 is opened and compressed gas can flow by way of the compressed-gas line 4 into a compressed-gas cylinder 5 having a diaphragm (not shown) which moves a piston rod 6 in the direction of the arrow 7. Connected to the piston rod 6 is a crosshead 8, to which are fastened the ends of two pull lines 9 of Bowden pulls 10, which are formed by cords and each of which leads to a pivoting unit 11 for the jib arm 12 of one of the two anti-skid devices respectively.

A rotatable holder 14 for a multiplicity of chain lines 15 is fastened to the end of each jib arm 12 pivotable about an axle 13. The holders 14 designed as friction wheels are pressed by the pull lines 9 against the flanks of the vehicle tires 16 assigned to them, as long as the compressed-gas cylinder 5 is subjected to compressed gas. When there is a relief of pressure, the return of the holders out of their operating position into a position of rest occurs. This takes place in that an oppositely directed movement, that is to say, in the incident shown, a movement in the anti-clockwise direction, is introduced into the pivot axle 13 of the jib arm 12 via a pull line 17 likewise designed as a cord. The pull line 17 is driven by a return spring which acts on the pull line via an abutment 19 fastened to the end of the pull line 17. The return spring 18 is accommodated in a protected manner in a cavity 20 of a carrying part 21.

Figure 2:
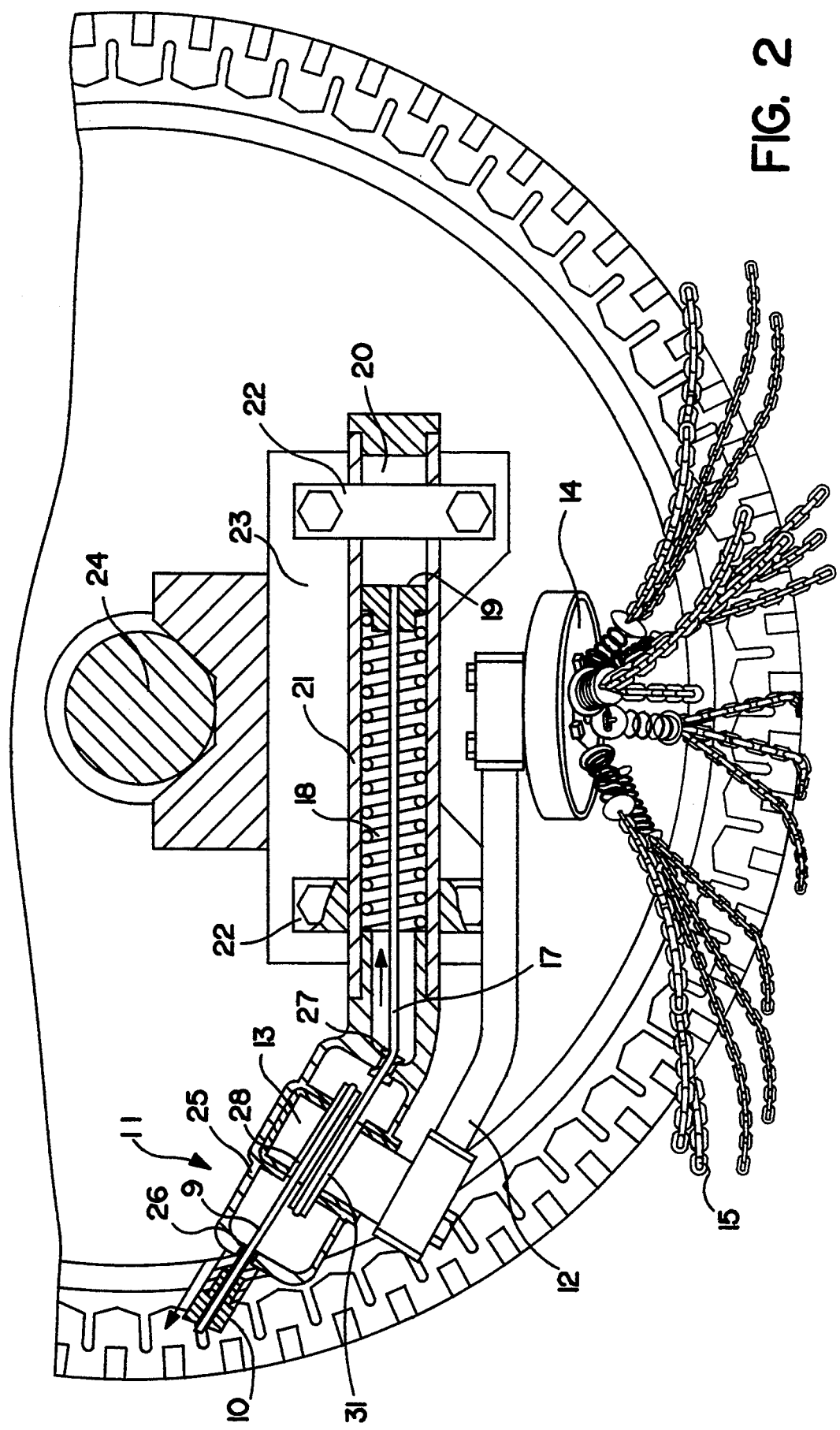
FIG. 2 shows, on an enlarged scale and partially in section, a side view of one of the anti-skid devices illustrated in FIG. 1.
Figure 3:
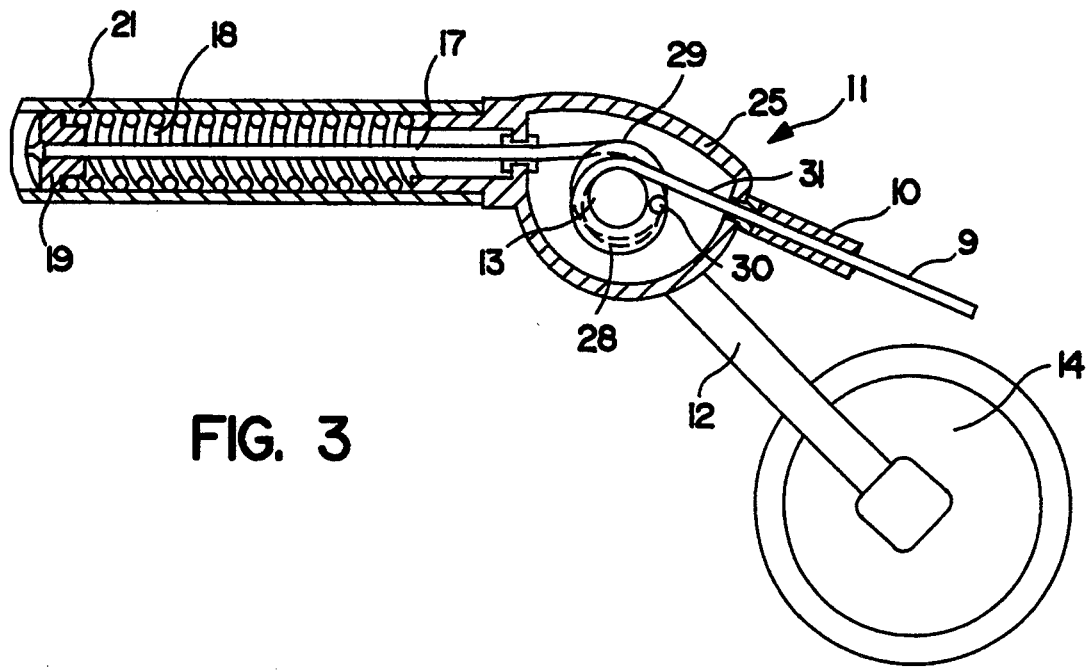
FIG. 3 shows the position of the holder and of the jib arm carrying it, in the position of rest of the anti-skid device.
Figure 4:
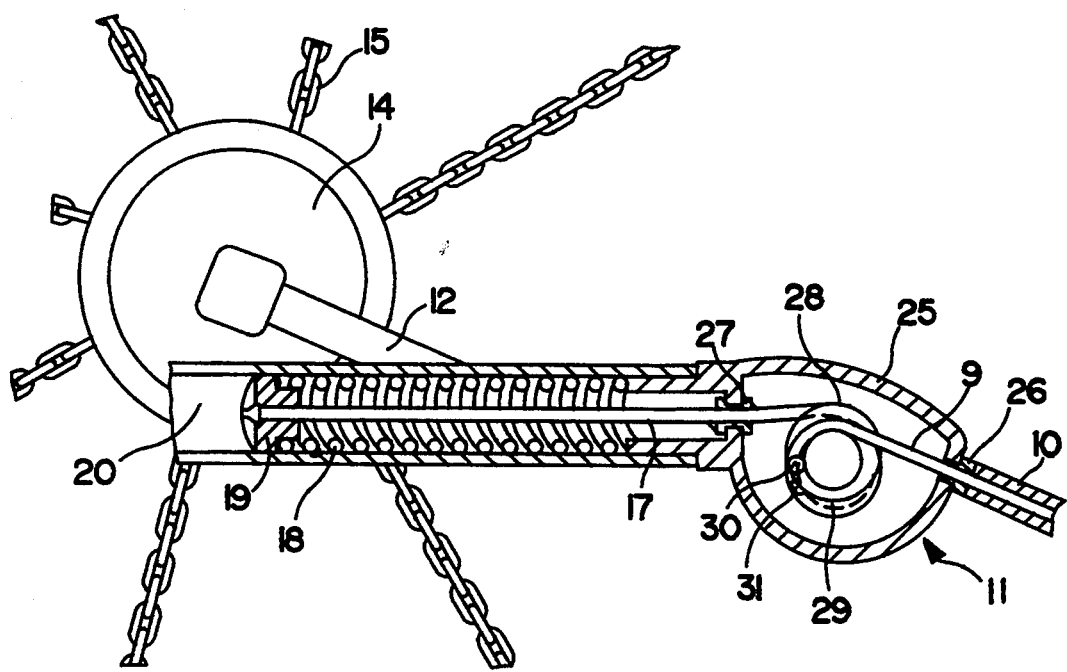
FIG. 4 shows the position of the holder and of the jib arm carrying it, in the operating position of the anti-skid device.

Details of the construction of the pivoting unit 11 and of the space-saving accommodation of the return spring 18 are shown in FIGS. 2 to 4.

It can be seen from FIG. 2 that the carrying part 21 formed by a tube is connected to the wheel axle 24 of the vehicle via a holding plate 23 by means of tube clips 22. Because the carrying part 21 is designed as a tube, the position of the anti-skid device relative to the vehicle tire 16 can be set exactly and easily. Connected captively to the carrying part 21 is the housing 25 of the pivoting unit, in which the pivot axle 13 of the jib arm 12 for the holder 14 is mounted.

The pull lines 9 and 17 are introduced into the housing 25 of the pivoting unit 11 through mutually opposite orifices 26, 27. The two pull lines 9 and 17 at least partially surround two driving pulleys 28, 29 arranged one above the other and connected fixedly in terms of rotation to the pivot axle 13, the end of the pull line 9 being connected to the driving pulley 28 at 30 and the end of the pull line 17 being connected to the driving pulley 29 at 31. The vertices of the driving pulleys 28 and 29 formed by eccentrics or arranged eccentrically are offset relative to one another at approximately 180°, in such a way that in the operating position the pull line 9 and in the position of rest the pull line 17 act on the pivot axle 13 with as large a lever arm as possible.

I claim:

1. In an anti-skid device for motor vehicles, said device including a plurality of chain lines (15) fastened to a holder (14) selectively movable from a non-operating position and into an operating position, said holder being driven by a tire of said motor vehicle into said operating position for rotating said holder; said plurality of chain lines having ends facing away from said holder and being propelled in a direction away from said holder and into a region of contact surface between said vehicle tire and the ground as a result of centrifugal forces when said holder is rotating in said operating position thereof; a pivoting unit (11) for a jib arm (12) for carrying the holder (14), said pivoting unit (11) for said jib arm arranged on a carrying part (21) fastened to the vehicle, said carrying part defining a cavity (20); first means comprising a first pull line (9), and means for actuating said first pull line for moving said jib arm (12) out of said non-operating position of said holder and into said operating position of said holder; and second means comprising a return spring (18) for moving said jib arm (12) out of said operating position of said holder and into said non-operating position of said holder; the improvement comprising:

a first driving pulley (28) fastened to one end of said first pull line (9), said first driving pulley (28) connected to a pivot axle (13) of said pivoting unit (11) and surrounding said first driving pulley (28) over at least a portion of the circumference thereof; said jib arm (12) being movable out of said operating position and into said non-operating position, said second means further comprising a second pull line (17) operatively associated with said return spring (18), said return spring (18) being arranged in said cavity (20) defined in said carrying part (21) for said pivoting unit (11), and a second driving pulley (29) fastened to one end of said second pull line (17), said second driving pulley (29) connected to said pivot axle of said pivoting unit (11) and surrounding said second driving pulley (29) over at least a portion of the circumference thereof.

2. Anti-skid device according to claim 1, wherein said pivoting unit includes a housing (25) fixedly connected to said carrying part (21), said housing defining entry orifices (26, 27) on mutually opposite sides of said housing for receiving said first and second pull lines (9, 17).

3. Anti-skid device according to claim 2, wherein said return spring (18) is a compression spring, said compression spring surrounding a portion of said second pull line (17), and an abutment (19) arranged at an end of second pull line (17) facing away from said second driving pulley (29) for transmitting the force applied by said compression spring to said second pull line (17).

4. Anti-skid device according to claim 2, wherein said first and second driving pulleys (28, 29) are eccentrically configured, said first and second driving pulleys having vertices arranged such that when said holder is in said operating position and when said holder is in said non-operating position, said first pull line (9), and said second pull line (17), respectively, act on said pivot axle (13) of said pivoting unit (11) via a longer lever arm to exert a greater turning moment on said pulleys than when said holder is in a position other than said operating or said non-operating position.

5. Anti-skid device according to claim 1, wherein said first and second driving pulleys (28, 29) are eccentrically configured, said first and second driving pulleys having vertices arranged such that when said holder is in said operating position and when said holder is in said non-operating position, said first pull line (9), and said second pull line (17), respectively, act on said pivot axle (13) of said pivoting unit (11) via a longer lever arm to exert a greater turning moment on said pulleys than when said holder is in a position other than said operating or said non-operating position.

6. Anti-skid device according to claim 5, wherein said vertices of said eccentrically arranged first and second driving pulleys (28, 29) are offset relative to each other at a displacement of substantially 180 degrees when said first and second pull lines (9, 17) are received in said housing (25) of said pivoting unit (11) on the same side of said pivot axle (13).

7. Anti-skid device according to claim 1, wherein said return spring (18) is a compression spring, said compression spring surrounding a portion of said second pull line (17), and an abutment (19) arranged at an end of second pull line (17) facing away from said second driving pulley (29) for transmitting the force applied by said compression spring to said second pull line (17).

8. Anti-skid device according to claim 7, wherein said first and second driving pulleys (28, 29) are eccentrically configured, said first and second driving pulleys having vertices arranged such that when said holder is in said operating position and when said holder is in said non-operating position, said first pull line (9), and said second pull line (17), respectively, act on said pivot axle (13) of said pivoting unit (11) via a longer lever arm to exert a greater turning moment on said pulleys than when said holder is in a position other than said operating or said non-operating position.

9. Anti-skid device according to claim 1 further including fluid transfer means operatively associated with said first and second pull lines for selectively actuating said first and second pull lines.

10. Anti-skid device as claimed in claim 9 wherein said fluid transfer means includes a source of compressed gas, a cylinder, and a gas line for supplying compressed gas from said source to said cylinder; said cylinder including a piston coupled to said first and second pull lines such that movement of said piston by said compressed gas supplied to said cylinder actuates said first and second pull lines.

11. Anti-skid device according to claim 1 wherein said first pull line (9) is designed as part of a Bowden pull (10).

12. Anti-Skid Device according to claim 1, wherein said carrying part (21) is formed by a tube, said pivoting unit (11) being arranged on an end of said tube.

* * * * *